June 19, 1962  J. H. HILL  3,039,269
SAFETY VALVE MECHANISM FOR HYDRAULIC BRAKE SYSTEM
Filed Jan. 13, 1961  2 Sheets-Sheet 1

INVENTOR.
James H. Hill
BY
Jennings, Carter & Thompson
Attorneys

June 19, 1962  J. H. HILL  3,039,269
SAFETY VALVE MECHANISM FOR HYDRAULIC BRAKE SYSTEM
Filed Jan. 13, 1961  2 Sheets-Sheet 2

INVENTOR.
James H. Hill
BY
Jennings Carter Thompson
Attorneys

United States Patent Office 3,039,269
Patented June 19, 1962

3,039,269
SAFETY VALVE MECHANISM FOR HYDRAULIC BRAKE SYSTEM
James H. Hill, Childersburg, Ala.
Filed Jan. 13, 1961, Ser. No. 82,559
6 Claims. (Cl. 60—54.5)

This invention relates to a safety valve mechanism for a vehicle hydraulic brake system and more particularly to a safety valve mechanism in the brake system which allows fluid pressure to be maintained in at least a portion of the brake system when a leak occurs in a brake line.

Heretofore, in safety valve mechanisms which allow pressure to be maintained on a portion of the brake system even when leaks occur, there has been a problem of presetting the piston in the safety valve mechanism. When the brake system is filled with brake fluid or when the brake lines are bled, the piston should be preset within the cylinder of the safety valve mechanism so that the brakes will be actuated properly. While the prior art shows safety valve mechanisms to permit the fluid pressure to be maintained in other lines when a leak or low pressure occurs in one line, these mechanisms have not provided for any means to preset automatically a piston within a cylinder of a safety valve mechanism when the system is bled or filled with fluid.

It is an object of the present invention to provide a safety valve mechanism in a hydraulic braking system comprising a cylinder having a piston therein with means to preset the piston within the cylinder when the braking system is filled with fluid or when the brake lines are being bled.

A further object of this invention is to provide a safety valve mechanism in a hydraulic braking system comprising a cylinder having a piston therein with the cylinder permitting the bleeding or filling of a brake line, and actuating means for the valve mechanism which does not move with the piston and is operated manually externally of the cylinder to permit, selectively, the flow of fluid around the piston so that the brake line may be bled.

An additional object of my invention is to provide one of my safety valve mechanisms in both the fluid line to the front wheels and the fluid line to the rear wheels with the safety valve mechanism shutting off the flow of fluid therefrom when a leak occurs in the line in which the valve mechanism is positioned. Thus, when a leak occurs either in the line to the rear wheels or in the line to the front wheels, the piston for the cylinder in that line seats to block the flow of fluid from the cylinder and fluid pressure is thereby maintained in the remainder of the brake system.

A more specific object is to provide a safety valve mechanism in a vehicle hydraulic braking system comprising a cylinder with a free floating piston therein having a slotted intermediate portion, and a valve stem extending transversely of the piston through the slotted portion with the valve stem having a passageway communicating selectively, with a fluid passageway bypassing the piston, thereby to open or close the passageway. Further, signal means on the indicator panel of the vehicle is provided to indicate the foremost position of the piston in the cylinder as occurs under a low fluid pressure.

Apparatus embodying features of my invention is shown in the accompanying drawings, forming a part of this application, in which.

Figure 1:
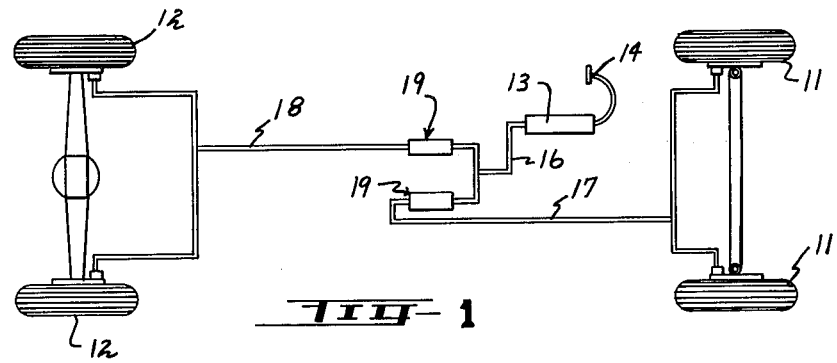
FIG. 1 is a diagrammatic view of a vehicle hydraulic brake system with my improved safety valve mechanism therein.

Referring now to FIG. 1, the front wheels of a vehicle are indicated by the numeral 11 and the rear wheels of a vehicle are indicated by the numeral 12. The vehicle hydraulic braking system comprises a master cylinder 13 that is actuated by a brake pedal 14 as well known in the art. Fluid line 16 leads from the master cylinder 13 to branch line 17 for front wheels 11 and branch line 18 for rear wheels 12. My improved safety valve mechanism indicated generally by the numeral 19 is positioned in each of the branch lines 17 and 18. Thus, in the event a leak occurs in front line 17, safety valve mechanism 19 in that line will stop the flow of fluid thereto which allows fluid pressure in fluid line 18 to rear wheels 12 to be maintained thereby allowing the vehicle to be braked. In like manner, if a leak occurs in brake line 18, safety valve mechanism 19 will stop the flow of fluid thereto. As is well known in the art, when pressure is applied to brake pedal 14, master cylinder 13 causes fluid pressure to be applied through brake lines 17 and 18 which actuate brake shoes (not shown) on wheels 11 and 12 through wheel cylinders (not shown).

My improved safety valve mechanism 19 comprises an outer casing forming a cylinder 21 having a central bore 22 therein with a forward bore 23 of reduced diameter and a rear bore 24 of reduced diameter. An end fitting indicated generally by numeral 26 is pressed within the rearward end of mechanism 19 to form rear end bore 24. A vent plug 28 is screwed within an opening 29 that extends to central bore 22. A washer 31 is positioned between end plug 26 and the end of mechanism 19 and spaces plug 26 from the end of casing 21.

Figure 2:
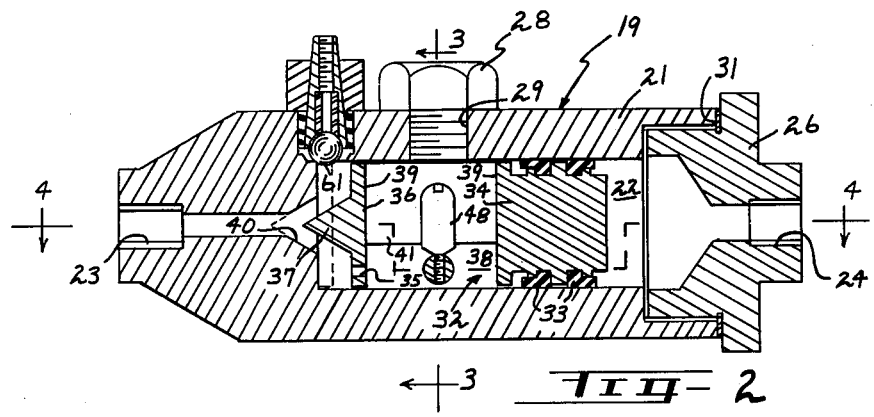
FIG. 2 is a cross-sectional view of my safety valve mechanism shown in FIG. 1 in the brake lines to both the front and rear wheels.
Figure 3:
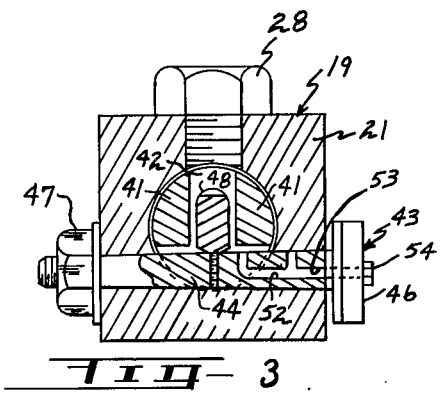
FIG. 3 is a cross sectional view taken generally along the line 3—3 of FIG. 2.

A free floating piston indicated generally by the numeral 32 is mounted within central bore 22 and moves forwardly toward end bore 23 when brake pedal 14 is applied thereby to increase fluid pressure in lines 17 and 18 to apply the brakes on wheels 11 and 12. After the brakes have been applied and pressure is released from brake pedal 14, piston 32 moves rearwardly to its original position thereby reducing fluid pressure. To prevent seepage of fluid past piston 32, seal rings 33 engage the wall of cylindrical bore 22. Piston 32 comprises a rear end portion 34 and a front end portion 36. Front end portion 36 has a pointed end member 37 which seats on a seat 40 and stops the flow of fluid through bore 23 when piston 32 reaches its foremost position as shown in dotted lines in FIG. 2. An opening 35 extends through portion 36 to allow the flow of fluid therethrough. Piston 32 has a slotted portion 38 between inner faces 39 of end portions 34 and 36. Spaced ribs 41 extend between and connect end portions 34 and 36. Opening 42 is formed between the spaced ribs 41 as shown in FIG. 3.

Figure 4:
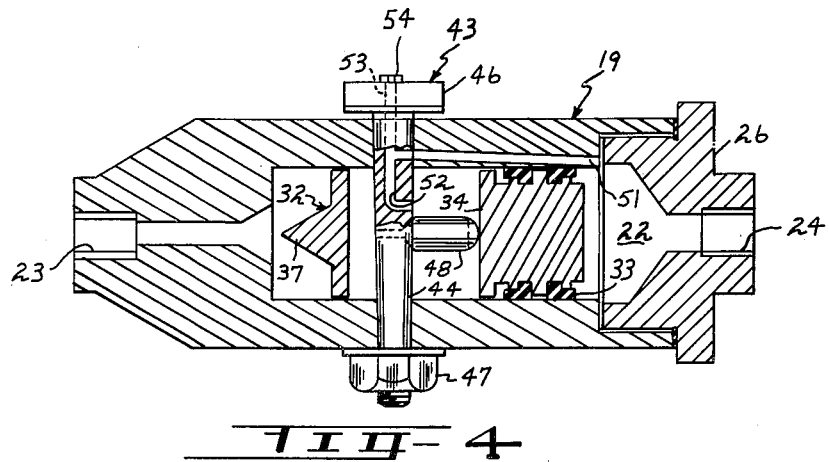
FIG. 4 is a sectional view taken generally along the line 4—4 of FIG. 2 and showing the piston being preset within the valve mechanism and with the valve in open position to permit bleeding of the brake line; and, FIG. 5 is a schematic view of the electrical circuit for the indicator on the dashboard of a vehicle.

Fluid control means to control the flow of the fluid when the brake system is bled is indicated generally by numeral 43 and extends transversely of casing 21 across slotted portion 38. Control means 43 comprises a tapered plug valve having a valve stem 44 and a gripping head 46 on the end of valve stem 44 positioned externally of casing 21 so that valve stem 44 may be turned manually. The end of valve stem 44 opposite head 46 is threaded and a nut 47 secures stem 44 in position. Valve stem 44 is tapered and formed of brass so that a very close tolerance is maintained between valve stem 44 and the opening in casing 21 receiving stem 44 thereby to prevent leakage of fluid around stem 44 without the use of washers or the like. A piston positioning member 48 is secured to stem 44 and moves therewith. As shown in FIGS. 2 and 3, positioning member 48 is in an upright position spaced from end portion 34. In FIG. 4, positioning member 48 is shown contacting end portion 34 of piston 32 thereby to space piston 32 properly within the bore 22 of valve mechanism 19. It should be noted that FIG. 4 shows the position of positioning member 48 when the brake lines are being bled while FIG. 2 shows the position of member 48 when the braking system is in normal operating position.

Fluid passageway 51 extends through casing 21 from end plug 26 to stem 44. Stem 44 likewise has a U-shaped passageway 52. Passageway 52 is vented by passageway 53 extending through valve stem 44. A suitable screw 54 or the like may be positioned over the end of vent 53 to render it fluid-tight. It should be noted that in FIG. 4, passageways 51 and 52 communicate with each other to permit a passage of fluid about end portion 34. Plug 26 is spaced from the end of passage 51 so that fluid may remain in passageway 51 at all times.

Figure 5:
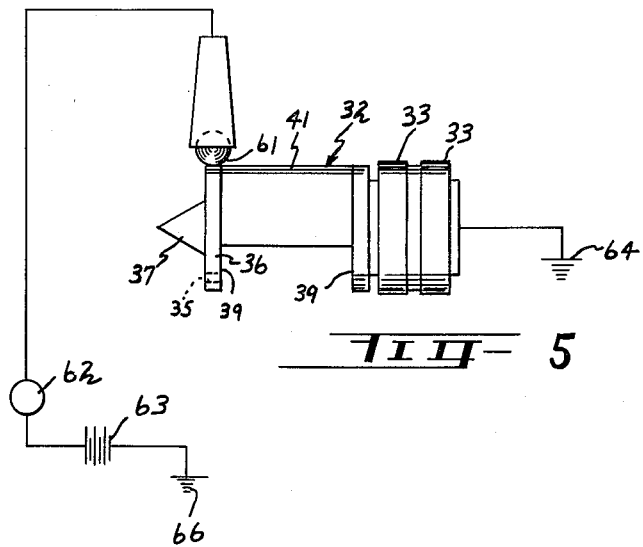

To indicate when piston 32 seats on seat 40 to close bore 23 such as occurs when fluid is leaking from a brake line or when piston 32 is not preset properly, means are provided as shown in FIG. 5 comprising a steel ball 61 which is engaged by end 36 when piston 32 reaches its foremost position as indicated in dotted lines in FIG. 2. It is understood that piston 32 reaches its foremost position when piston 32 is not properly positioned as when the fluid supply is unusually low or has leaked from the brake line. An indicator 62 may be positioned on the panel of the vehicle and a battery 63 supplies power thereto. Piston 32 is grounded as at 64 and battery 63 is grounded at 66. The circuit is completed when end 36 engages ball 61 thereby to energize indicator 62.

In operation, with piston 32 in the normal operating position as shown in FIG. 2, pressure on brake pedal 14 will move piston 32 to the left viewing FIG. 2 thereby exerting fluid pressure on the brake cylinders (not shown) of wheels 11 and 12. It is well known that free floating piston 32 must be properly positioned within cylinder 21 so that the proper actuation of the brakes is assured. When it is desired to fill the brake system with fluid or to bleed brake lines 17 and 18, valve stem 44 is turned to the position shown in FIG. 4 so that passageways 52 and 51 communicate with each other to permit the flow of fluid about end portion 34. When valve stem 44 is in this position, positioning member 48 contacts end face 39 of end portion 34 and pushes piston 32 to the position shown in FIG. 4 so that piston 32 is properly positioned within valve mechanism 19 when the brake lines are bled or the system is filled with fluid. Therefore, no presetting of piston 32 within cylinder 19 is required as positioning member 48 automatically positions piston 32 properly when turned to the position shown in FIG. 4. In the normal operating position shown in FIG. 2, passageways 51 and 52 do not communicate thereby preventing fluid from bypassing end portion 34 of piston 32.

From the foregoing, it will be understood that I have provided a safety valve mechanism in a hydraulic braking system that stops the flow of fluid from the mechanism when the piston reaches the foremost position and which presets the piston automatically within the cylinder when the brake lines are filled with fluid or bled. Further, the valve stem 44 which is actuated to preset piston 32 within cylinder 21 is actuated externally of valve casing 19 and does not move with the piston. By providing two such safety valve mechanisms, one for the brake line to the front wheels and one for the brake line to the rear wheels, a leak in one of the brake lines will not affect the other brake line as the flow of fluid through the leaking line will be stopped and fluid presssure will be maintained on the other line. An indicator is provided on the panel of the vehicle to indicate when the piston reaches its foremost position in the cylinder thereby directing the attention of the vehicle operator that the braking system must be adjusted or repaired.

While I have shown my invention in but one form, it will be obvious to those skilled in the art that it is not so limited but is susceptible of various changes and modifications without departing from the spirits thereof, and I desire, therefore, that only such limitations shall be placed thereupon as are specifically set forth in the appended claims.

What I claim is:

1. In a hydraulic braking system having a fluid source, a conduit extending from said source, a cylinder in said conduit, a free piston in said cylinder and being actuated by fluid pressure of the braking system, a fluid passageway bypassing said piston to permit the flow of fluid around the piston, adjustable fluid control means in said passageway and separate from said piston to permit, selectively, the flow of fluid through said passageway, and a piston positioning member operatively connected to said fluid control means and operable upon opening of said fluid passageway to move the piston to a predetermined position within said cylinder thereby presetting the piston in the cylinder.

2. In a hydraulic braking system having a fluid source, a conduit extending from said source, a cylinder in said conduit, a free floating piston working in said cylinder and being actuated by fluid pressure of the braking system, said piston moving to the end of the cylinder and seating thereat when a low fluid pressure is obtained, a fluid passageway permitting fluid to flow from one end of the piston to the other end thereof, fluid control means positioned in said passageway and separate from said piston to open and close, selectively, said passageway, and a piston positioning member operatively connected to said control means and operable upon opening of said fluid passageway by said control means to move the piston to a predetermined position within said cylinder thereby presetting the piston within the cylinder.

3. In a hydraulic braking system for a vehicle, a master cylinder, a fluid line extending from the master cylinder to the front wheels of the vehicle, a second fluid line extending from the master cylinder to the rear wheels, a safety valve mechanism in each of said fluid lines between the master cylinder and the respective wheels, a free floating piston working in each of the valve mechanisms and being actuated by fluid pressure of the braking system, a fluid passageway extending through the body of each valve mechanism, control means separate from said piston communicating with said fluid passageway to open and close the passageway thereby controlling the flow of fluid therethrough, and means operatively connected to said control means and operable upon opening of said fluid passageway by said control means to move the piston to a predetermined position within said valve mechanism thereby presetting the piston within the valve mechanism.

4. In a hydraulic braking system for a vehicle, a master cylinder, a fluid line extending from the master cylinder to at least one wheel, a safety cylinder in said fluid line between the master cylinder and the wheel, a free floating piston working in said safety cylinder and being actuated by fluid pressure of the braking system, said piston having an intermediate slot therein, fluid control means in said slot having actuating means extending outside the safety cylinder and being mounted for rotative movement, said fluid control means being fixed against axial movement and said piston moving relative to the fluid control means, a fluid passageway extending through the body of the safety cylinder from one end thereof to the fluid control means, said fluid control means having a fluid passageway communicating with the fluid passageway of the safety cylinder and movable between closed and open positions with respect to said passageway, and a positioning member on said fluid control means contacting said piston adjacent an end of said slot only when the fluid passageways are open thereby moving the piston to a predetermined position within said cylinder to preset the piston.

5. Means positioned in a fluid line of a vehicle braking system to permit bleeding and filling of a brake line extending from a master cylinder to a vehicle wheel, said means comprising a fluid safety cylinder, a free floating piston in said cylinder being actuated by fluid pressure of the braking system and movable to a seated forward position when the fluid pressure between the piston and the wheel is low, said piston having a slotted portion between the ends thereof to form inner facing surfaces, a valve stem extending transversely of the piston and through the casing of the cylinder, means externally of the cylinder to permit rotation of the valve stem manually, a fluid passageway extending through the casing of the cylinder from one end of the cylinder about one end of the piston to the slotted portion, said valve stem having a passageway communicating with the passageway in said cylinder and with said slotted portion and movable between open and closed positions with relation to said cylinder passageway, an additional passageway extending from the slotted portion to the other end of said cylinder whereby fluid may flow from one end of the piston to the other end thereof when the passageways are open, and means operable when the piston reaches its foremost position to indicate the position of the piston.

6. Means defined in claim 5 in which a positioning member on the valve stem and movable therewith contacts one of said inner facing surfaces when the valve stem is rotated to open position to move the piston to a predetermined position within the cylinder thereby presetting the piston.

References Cited in the file of this patent

UNITED STATES PATENTS 2,174,615    Bowen et al.    Oct. 3, 1939
2,709,896    Taylor    June 7. 1955